(12) United States Patent
Winkler (10) Patent No.: US 8,793,927 B2
(45) Date of Patent: Aug. 5, 2014

(54) METHOD AND APPARATUS FOR TRAPPING INSECTS

(76) Inventor: William Winkler, Oakland, CA (US)

( * ) Notice: Subject to any disclaimer, the term of this patent is extended or adjusted under 35 U.S.C. 154(b) by 714 days.

(21) Appl. No.: 12/130,968

(22) Filed: May 30, 2008

(65) Prior Publication Data

US 2009/0293342 A1   Dec. 3, 2009

(51) Int. Cl.
*A01M 1/10* (2006.01)
*A01M 1/14* (2006.01)
*A01M 1/02* (2006.01)

(52) U.S. Cl.
USPC ............................................. 43/107; 43/114

(58) Field of Classification Search
USPC ........................................... 43/107, 114, 122
See application file for complete search history.

(56) References Cited

U.S. PATENT DOCUMENTS

| | | | | |
|---|---|---|---|---|
| 29,008 A | * | 7/1860 | Robertson | 43/122 |
| 862,467 A | * | 8/1907 | Gardiner | 43/114 |
| 885,615 A | * | 4/1908 | Handler et al. | 43/114 |
| 919,507 A | * | 4/1909 | Wiegand et al. | 43/114 |
| 935,428 A | * | 9/1909 | Stranzenbach | 43/114 |
| 944,882 A | * | 12/1909 | Laube | 43/114 |
| 954,887 A | * | 4/1910 | Ross | 43/114 |
| 1,071,578 A | * | 8/1913 | Rese | 43/114 |
| 1,112,064 A | * | 9/1914 | Gordon | 43/114 |
| 1,118,845 A | * | 11/1914 | Day | 43/114 |
| 1,521,261 A | * | 12/1924 | Tschernitschek | 43/114 |
| 1,634,648 A | * | 7/1927 | Cardinet | 43/107 |
| 1,643,118 A | * | 9/1927 | Hahn | 43/114 |
| 2,177,670 A | * | 10/1939 | Peirson | 43/114 |
| 2,193,492 A | * | 3/1940 | Richardson | 43/107 |
| 3,398,478 A | * | 8/1968 | Pearsall | 43/114 |
| 3,685,199 A | * | 8/1972 | Bradshaw | 43/114 |
| 3,729,858 A | * | 5/1973 | Bradshaw | 43/114 |
| 3,755,958 A | * | 9/1973 | Bradshaw | 43/114 |
| 3,863,384 A | * | 2/1975 | Weatherston et al. | 43/114 |
| 4,133,137 A | * | 1/1979 | van Adelsberg | 43/114 |
| 4,156,321 A | * | 5/1979 | Capizzi et al. | 43/114 |
| 4,244,134 A | * | 1/1981 | Otterson | 43/114 |
| 4,411,093 A | * | 10/1983 | Stout et al. | 43/114 |
| 4,442,624 A | * | 4/1984 | Browne | 43/107 |
| 4,592,163 A | * | 6/1986 | Wilson | 43/107 |
| 4,961,282 A | * | 10/1990 | Hoppe | 43/114 |
| 5,303,501 A | * | 4/1994 | Seemann | 43/114 |

(Continued)

FOREIGN PATENT DOCUMENTS

| | | | | |
|---|---|---|---|---|
| EP | 26419 A1 * | 4/1981 | | A01M 1/14 |
| EP | 2210488 A2 * | 7/2010 | | A01M 1/14 |

(Continued)

*Primary Examiner* — Darren W Ark
(74) *Attorney, Agent, or Firm* — DLA Piper LLP (US)

(57) ABSTRACT

An insect trap method and apparatus is provided. The apparatus includes a durable housing formed from a single plastic sheet and configured to include a flappable hook and an enclosure having two open ends, such that the enclosure includes a plurality of surfaces. The apparatus also includes at least one insect trap liner, such that the at least one insect trap liner releasably attaches to at least one of the plurality of surfaces. The method includes inserting at least one replaceable insect trap liner into a durable housing. Within this embodiment, the housing is formed from transparent plastic and configured to include a flappable hook and an enclosure having two open ends, such that the enclosure includes an interior wall and an exterior wall. This method also includes the step of hanging the housing from the flappable hook onto a desired location.

20 Claims, 14 Drawing Sheets

(56) References Cited

U.S. PATENT DOCUMENTS

| | | | |
|---|---|---|---|
| 5,396,729 A * | 3/1995 | Vejvoda | 43/114 |
| 5,685,109 A * | 11/1997 | Rimback | 43/107 |
| 5,907,923 A * | 6/1999 | Heath et al. | 43/122 |
| 6,018,905 A * | 2/2000 | Lingren | 43/107 |
| 6,516,558 B1 * | 2/2003 | Lingren et al. | 43/114 |
| 6,594,947 B2 * | 7/2003 | Lingren et al. | 43/114 |
| 7,856,753 B2 * | 12/2010 | Fisher | 43/122 |
| 8,079,175 B2 * | 12/2011 | Calkins et al. | 43/114 |
| 8,240,081 B2 * | 8/2012 | Cuellar Bernal | 43/114 |
| 2004/0020104 A1 * | 2/2004 | Feldhege et al. | 43/114 |
| 2006/0283075 A1 * | 12/2006 | Feldhege et al. | 43/114 |
| 2006/0283076 A1 * | 12/2006 | Chambers et al. | 43/114 |
| 2007/0094915 A1 * | 5/2007 | Plato et al. | 43/114 |
| 2008/0086932 A1 * | 4/2008 | Cook et al. | 43/114 |
| 2009/0183419 A1 * | 7/2009 | Harris | 43/114 |
| 2010/0154290 A1 * | 6/2010 | Fisher | 43/114 |
| 2010/0242339 A1 * | 9/2010 | Cuellar Bernal | 43/114 |

FOREIGN PATENT DOCUMENTS

| | | | | |
|---|---|---|---|---|
| FR | 2663507 A1 * | 12/1991 | | A01M 1/00 |
| JP | 01055137 A * | 3/1989 | | A01M 1/14 |
| JP | 01063329 A * | 3/1989 | | A01M 1/14 |
| JP | 09107859 A * | 4/1997 | | A01M 1/14 |
| JP | 2001069894 A * | 3/2001 | | A01M 1/14 |
| JP | 2001169708 A * | 6/2001 | | A01M 1/00 |
| JP | 2004208670 A * | 7/2004 | | A01M 1/10 |
| JP | 2004261106 A * | 9/2004 | | A01M 1/14 |
| JP | 2006311802 A * | 11/2006 | | A01M 1/14 |
| JP | 2007097408 A * | 4/2007 | | A01M 1/14 |
| JP | 2007306823 A * | 11/2007 | | A01M 1/14 |
| JP | 2007330120 A * | 12/2007 | | A01M 1/10 |
| WO | WO 9529585 A2 * | 11/1995 | | A01M 1/00 |

* cited by examiner

METHOD AND APPARATUS FOR TRAPPING INSECTS

TECHNICAL FIELD

The present invention is directed generally towards monitoring the presence of insects, and more particularly towards a durable method and apparatus for trapping insects.

BACKGROUND

The presence of particular types of insects in an area can have several adverse affects. The presence of particular types of mosquitoes, for example, may raise health concerns related to Malaria. Similarly, the presence of particular types of agricultural pests (e.g., the light brown apple moth) may raise economic concerns for farmers who might lose entire crops. To address such concerns, it is important for agriculture and urban areas both to have an effective and efficient mechanism for monitoring different types of insects.

Insect control can be more effective when monitoring for a specific insect in a specific location. In California, for example, a new species of insect called the Light Brown Apple Moth has been recently discovered, which could cost the state of California millions of dollars either in lost crops or conflict with the citizens of the state that don't want the area to be sprayed with a pesticide. By using an "insect monitoring trap," however, one can time pesticide treatment for best results and for reducing the total use of pesticide. A grower may, for example, simply set up monitoring traps in a crop area and watch for pests that might threaten his/her crop.

Although several types of monitoring traps are currently available, these traps generally exhibit many undesirable characteristics. For example, because the housing for most of these traps are made of cardboard, they are typically not durable enough to be used for multiple seasons and must be monitored by viewing the traps through an open end since they are not transparent. Also, because these traps typically require a separate hanger wire, at least a two distinct manufacturing processes are typically required—one for the insect trap housing and one for manufacturing/inserting the hanger wire. Use of such a hanger wire is undesirable since it makes recycling the insect trap burdensome (i.e., because the hanger wire and housing are made of different materials) and also limits the locations onto which the insect trap may be placed (e.g., because the hanger wire must have a clearance greater than the diameter of a placement location). Another limitation of currently available insect traps is the inefficient use of lures (e.g., pherenome lures, which may include "septa" plugs). For example, since current techniques involve placing a lure directly on an insect trap liner (which is usually a "sticky" card), these lures are often prematurely discarded whenever the insect trap liners are replaced (e.g., replacing an insect trap liner every ten days and having to discard the pherenome lure that may last up to thirty days).

Accordingly, it is desirable to provide a durable transparent insect trap that could be used for multiple seasons and is entirely recyclable. It is also desirable to provide an insect trap that could be easily placed on locations having diameters larger than the clearance of the insect trap hangers, and then easily removed. Furthermore, it is desirable to provide a structure that allows a lure to be placed within the insect trap, yet away from the insect trap liner, so that the lure and the insect trap liner could be replaced independent of each other.

SUMMARY OF THE INVENTION

In an embodiment of the present invention, an insect trap apparatus is provided, which includes a durable housing formed from a single plastic sheet. Within this embodiment, the housing is configured to include a flappable hook and an enclosure having two open ends, such that the enclosure includes a plurality of surfaces. The insect trap for this embodiment also includes at least one insect trap liner, such that the at least one insect trap liner releasably attaches to at least one of the plurality of surfaces.

In another embodiment of the present invention, an insect trap apparatus is provided, which includes a durable housing formed from transparent plastic. Within this embodiment, the housing is configured to include a flappable hook and an enclosure having two open ends, such that the enclosure includes an interior wall and an exterior wall. The insect trap for this embodiment also includes at least one insect trap liner, such that the at least one insect trap liner releasably attaches to the interior wall.

In yet another embodiment of the present invention, a method for trapping insects is provided, which includes inserting at least one replaceable insect trap liner into a durable housing. Within this embodiment, the housing is formed from transparent plastic and configured to include a flappable hook and an enclosure having two open ends, such that the enclosure includes an interior wall and an exterior wall. This method also includes the step of hanging the housing from the flappable hook onto a desired location.

These and other features, advantages and embodiments will be appreciated by a review of the following detailed description and related drawings.

DESCRIPTION OF A PREFERRED EMBODIMENT

The present invention will now be described in detail with reference to the drawings, which are provided as illustrative examples of the invention so as to enable those skilled in the art to practice the invention. Notably, the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

Through out this summary the terms long sides and short sides will be used to simplify specific observations and references as the preferred embodiment is of a symmetrical shape. This preferred embodiment is of the type of design and construction that allows for manufacturing using standard manufacturing techniques such as steel rule die cutting and plastic vacuum forming. The preferred embodiment also works with the limitations of standard plastic sheet stock sizes, reducing waste in the manufacturing process. Furthermore, the preferred embodiment provides a device that can be easily broken down into its primary plastic component(s) for easy recycling and is preferably made from transparent plastic for easier inspection.

Figure 1A:
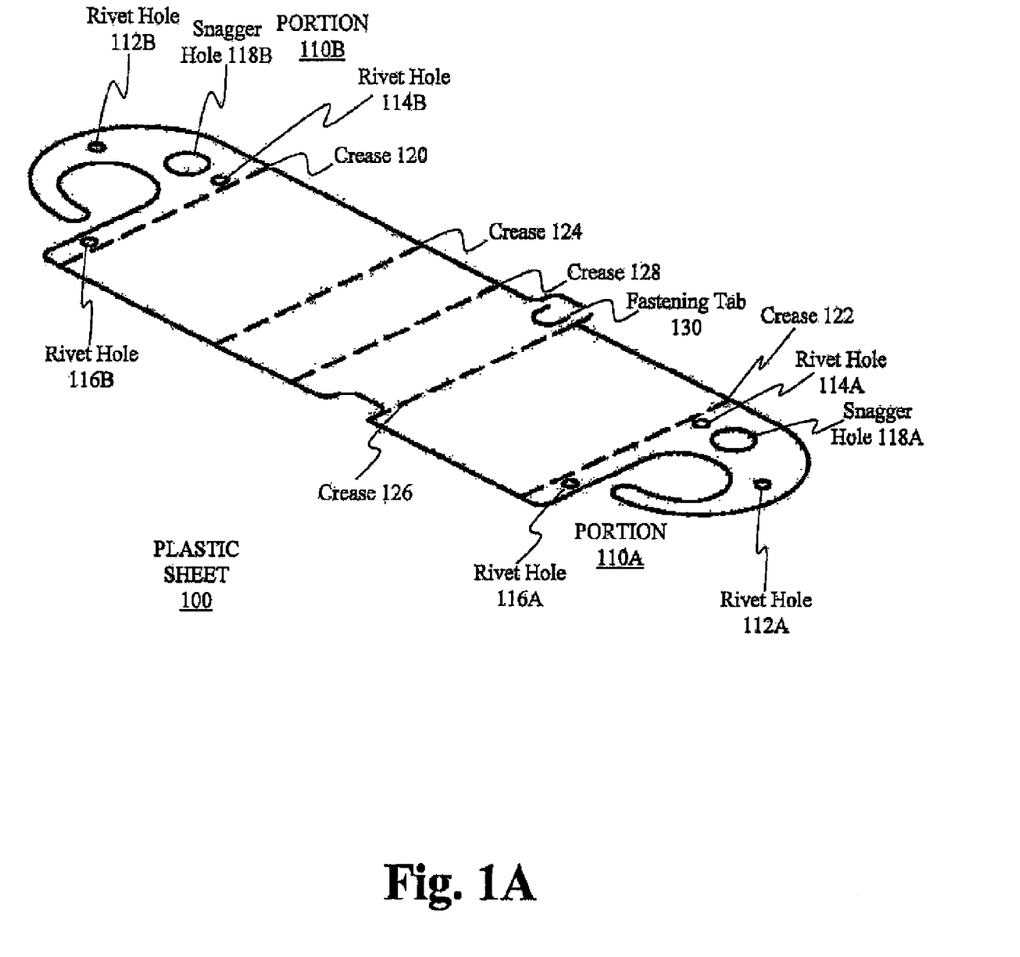
FIG. 1A is a schematic of a preassembled housing for an insect trap according to an embodiment of the invention.

In an embodiment of the present invention, a durable housing for an insect trap is constructed from a single sheet of plastic material. In FIG. 1A, a schematic of a preassembled housing according to a preferred embodiment is provided. As illustrated, preassembled housing 100 is preferably a single plastic sheet that includes a plurality of creases 120, 122, 124, 126, and 128. Preassembled housing 100 also preferably includes fastening tab 130 and flappable hook portions 10A and 110B. As illustrated, each of flappable hook portions 110A and 110B may further include rivet holes 112A-B, 114A-B, and 116A-B, as well as snagger holes 118A-B. All of the rivet holes 112A-B, 114A-B, and 116A-B, as well as snagger holes 118A-B, are preferably cut in the die cutting process.

Preassembled housing 100 is preferably cut in a conventional die cutting method with a steel rule die, that cuts one part at a time making the thru cuts as well as the creases in one operation. The material may be folded at the creases when assembled. The material used is preferably clear polypropylene although other materials such as polyethylene or vinyl could be used. Here, it should be noted that the thickness of the polypropylene used could be varied depending on particular cost and structural strength design limitations.

Figure 1B:
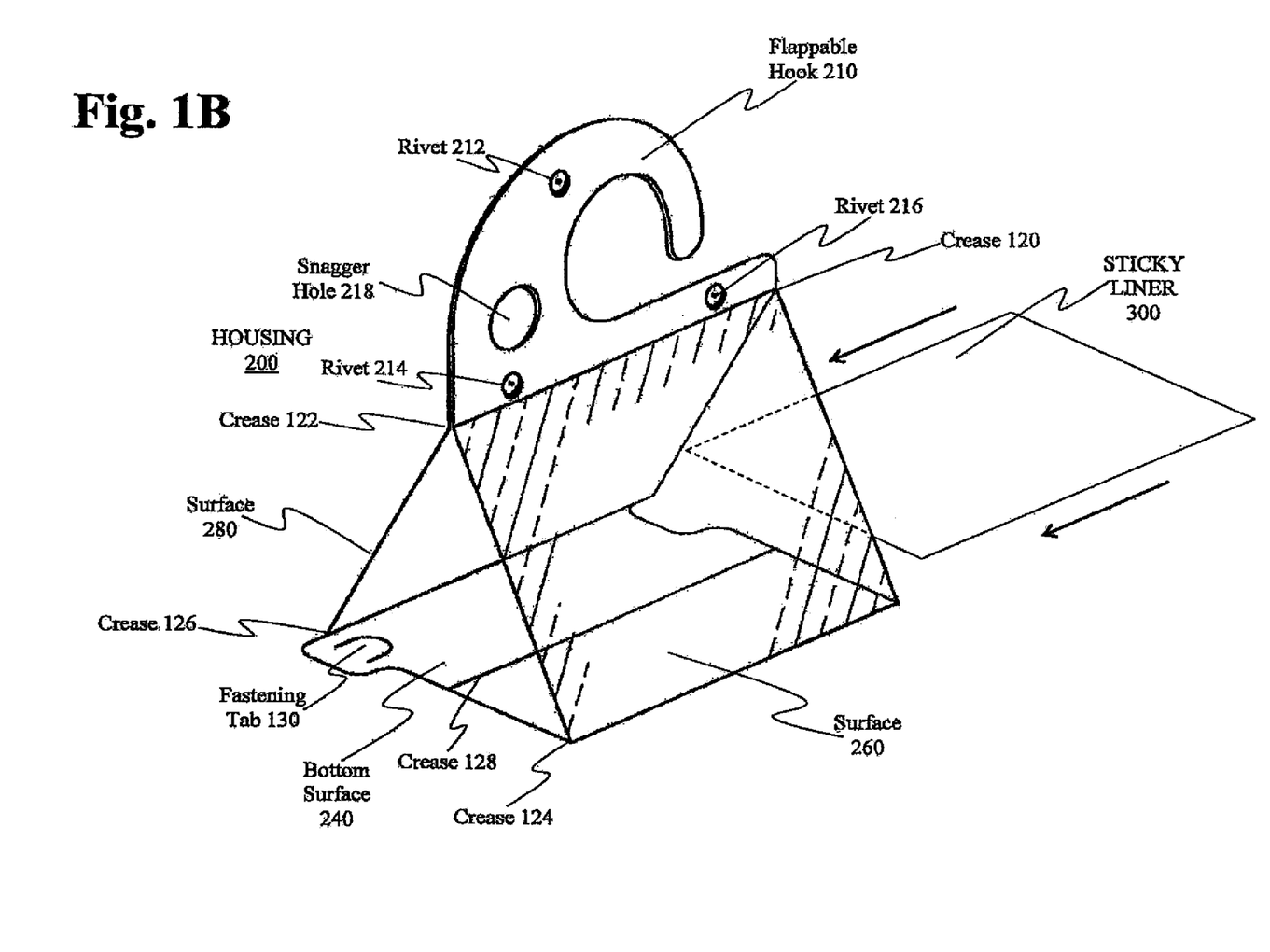
FIG. 1B is a schematic of an assembled housing for an insect trap according to an embodiment of the invention.

In FIG. 1B, a schematic of an assembled housing for an insect trap according to an embodiment of the invention is provided. As illustrated, assembled housing 200 is formed when each of creases 122, 124, and 126 are bent as shown. More specifically, preassembled housing 100 is bent at each of creases 122, 124, and 126 so that each of rivet holes 112A-B, 114A-B, and 116A-B, as well as snagger holes 115A-B, are aligned. Within such embodiment flappable hook 210 is thus formed when flappable hook portions 110A and 110B are attached at rivet holes 112A-B, 114A-B, and 116A-B via rivets 212, 214, and 216 (wherein, rivets 212, 214, and 216 are also preferably made of polypropylene). As a result, assembled housing 200 includes flappable hook 210 having snagger hole 218, as well as a plurality of surfaces 240, 260, and 280 which form an enclosure having two open ends, as shown. Here, it should be appreciated that, because the flappable hook 210 is an integral part of housing 200, the need for an additional metal hanging hook or wire, as required for prior art insect traps, is eliminated.

In a preferred embodiment, an insect trap liner 300 is inserted into the enclosure formed by surfaces 240, 260, and 280 where it releasably attaches to assembled housing 200 via fastening tab 130. Here, it should be appreciated that, although fastening tab 130 is shown on bottom surface 240, fastening tab 130 could be positioned in any of various combinations of surfaces 240, 260, and 280, depending on the preferred number and location of insect trap liners 300, so that an insect trap liner 300 may be inserted anywhere on the inner wall of the enclosure. In one embodiment, for example, a fastening tab 130 could be located on each of surfaces 240, 260, and 280, so as to allow the user to decide how many insect trap liners 300 are needed and where they should be placed. Within such embodiment, a user may decide that only remainder surfaces 260 and 280 should have insect trap liners 300. Such a configuration might be desirable if the user wants to keep bottom surface 240 transparent so as to view the insect trap liners 300 from ground level and avoid having to remove the trap (e.g., from a location that is difficult to reach). Other users, however, may want each of surfaces 240, 260, and 280 to have an insect trap liner 300 (e.g., to maximize space), whereas other users may only want one of surfaces 240, 260, and 280 to have an insect trap liner 300 (e.g., to minimize costs).

Figure 1C:
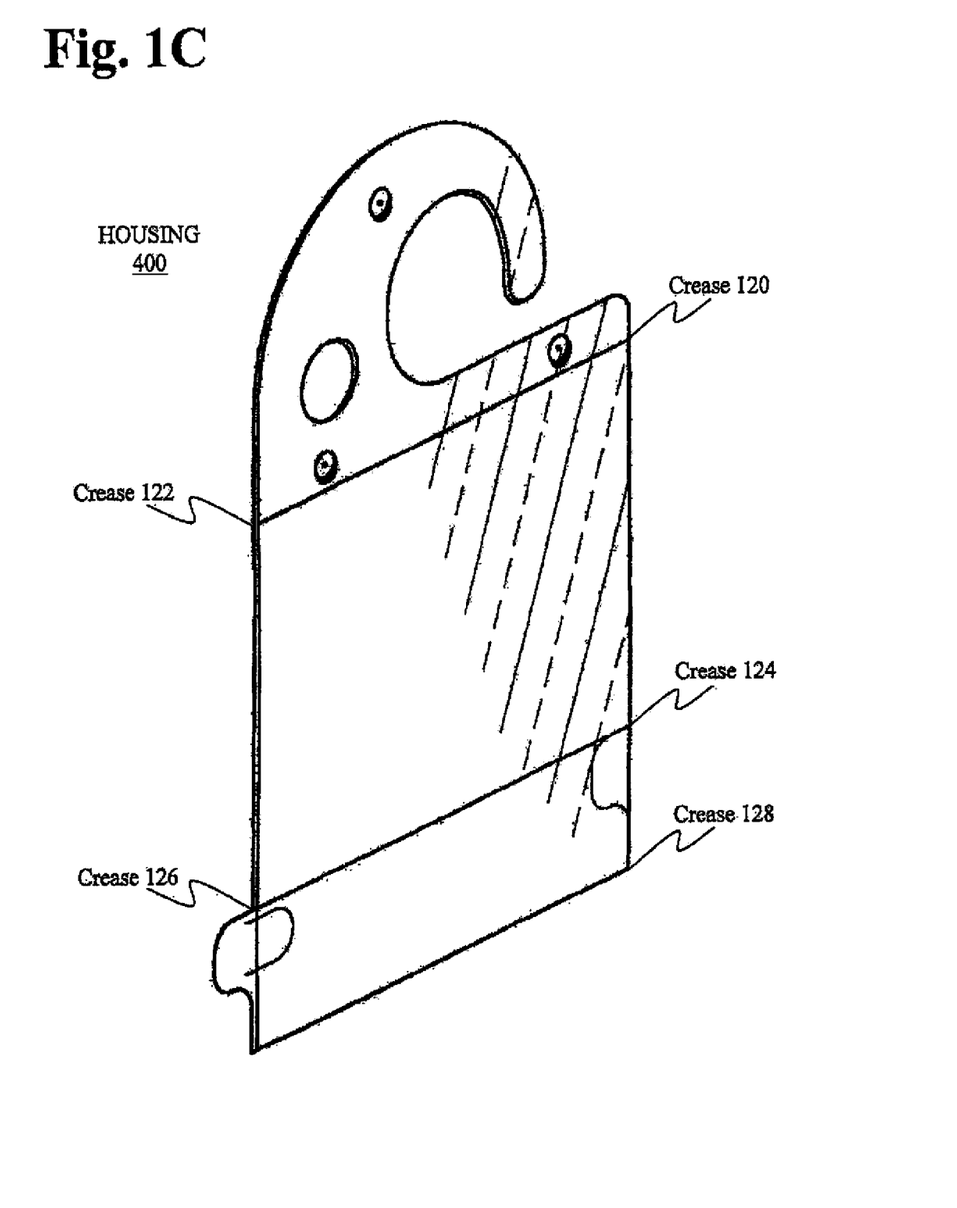
FIG. 1C is a schematic of a collapsed housing for an insect trap according to an embodiment of the invention.

It should be appreciated that it may sometimes be desirable to collapse assembled housing 200. In FIG. 1C, a schematic of a collapsed housing for an insect trap according to an embodiment of the invention is provided. As illustrated, each of creases 120, 122, 124, 126, and 128 are appropriately bent/straightened so that collapsed housing 400 is substantially flat.

Figure 2:
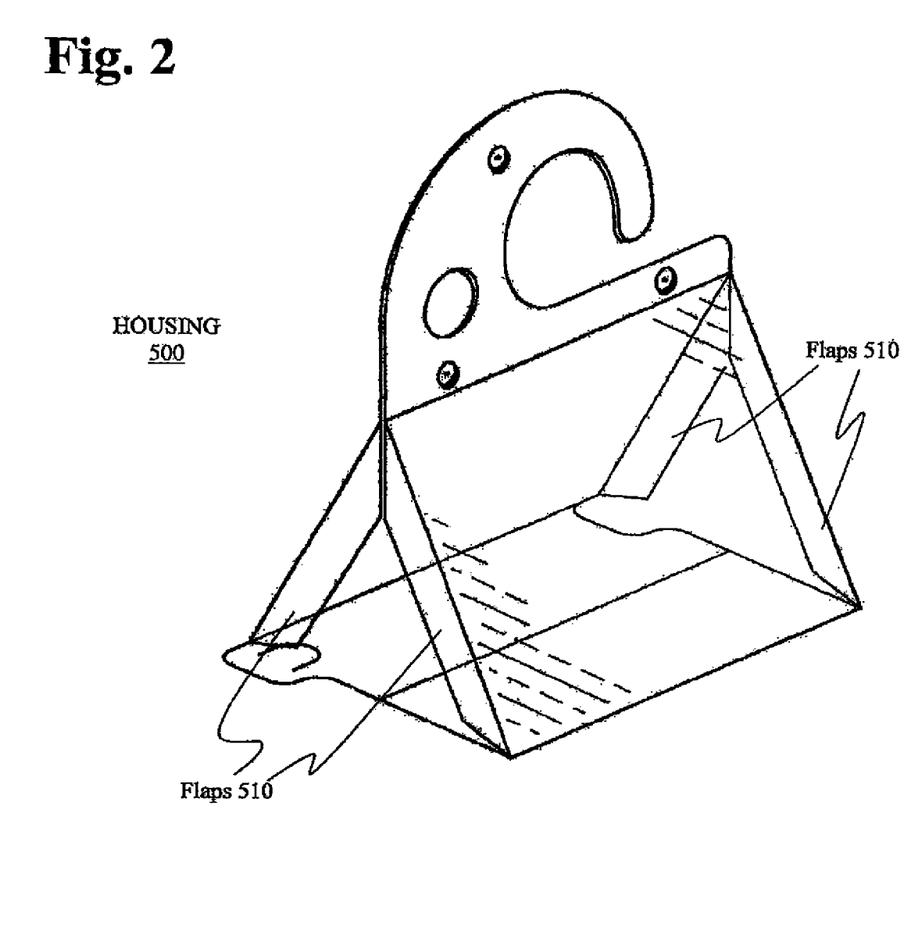
FIG. 2 is a schematic of an assembled housing with flaps for an insect trap according to an embodiment of the invention.

For some uses, it may be desirable to restrict the air movement within the insect trap enclosure. For such applications, a plurality of flaps 510 may be provided at either end of housing 500, as shown in FIG. 2.

Figure 3A:
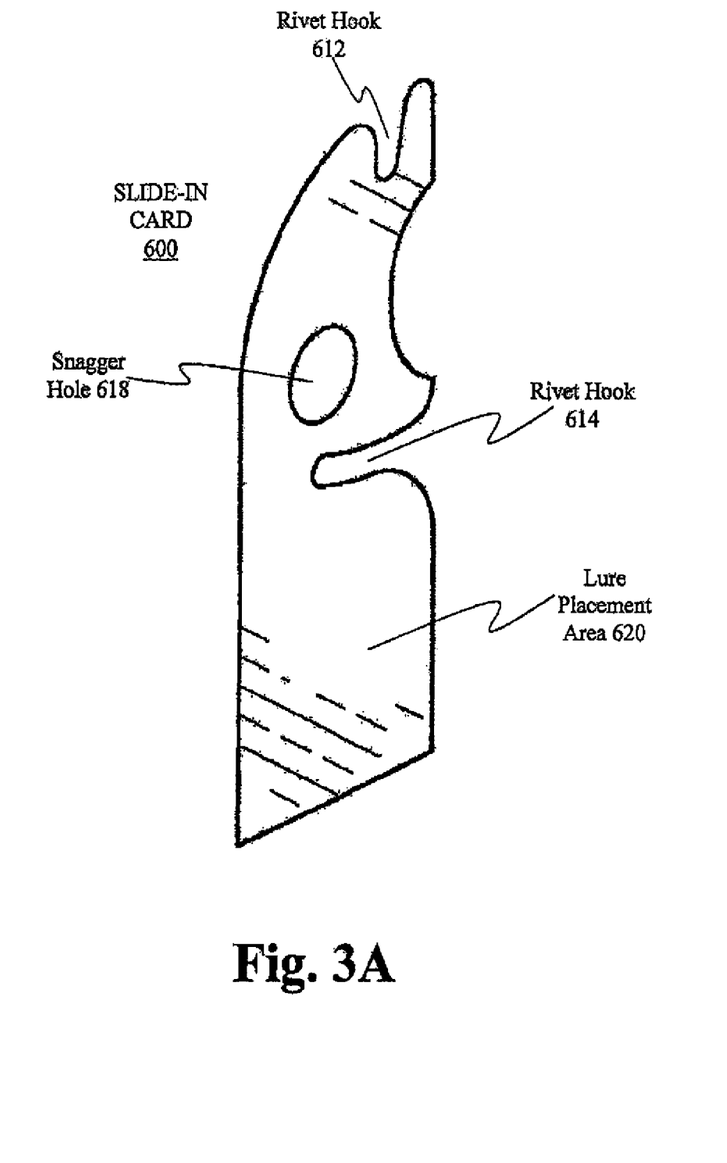
FIG. 3A is a schematic of a slide-in card for an insect tap according to an embodiment of the invention.

It may also be desirable to provide a structure that allows a lure to be placed within the enclosure of the insect trap, yet away from its inner wall. By including such a structure, the lure and insect trap liners of an insect trap could be replaced independent of each other. A slide-in card, for example, could be configured to releasably attach to assembled housing 200. In FIG. 3A, an exemplary schematic of such a slide-in card according to an embodiment of the invention is provided. As illustrated, slide-in card 600 includes snagger hole 618, lure placement area 620, and rivet hooks 612 and 614.

Figure 3B:
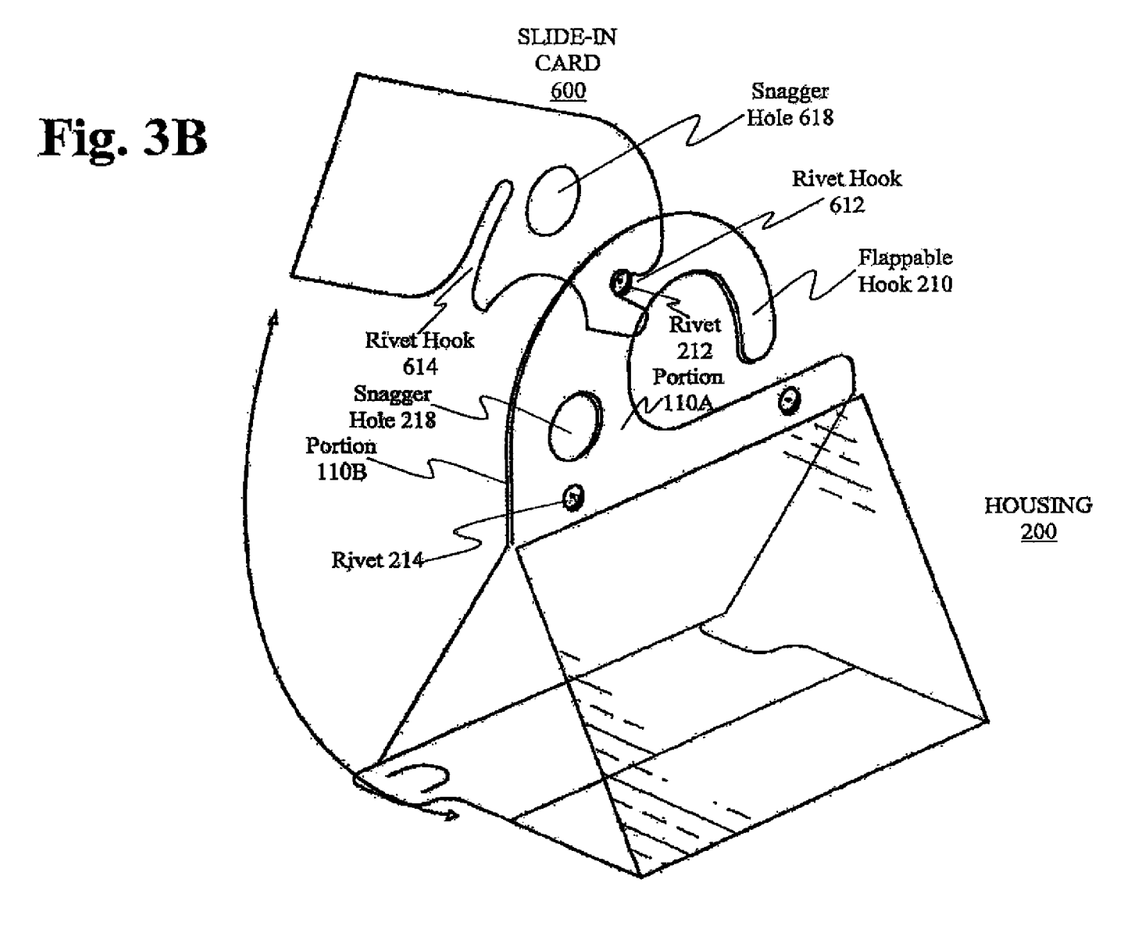
FIG. 3B is an illustration of how a slide-in card attaches to a housing for an insect trap according to an embodiment of the invention.
Figure 3C:
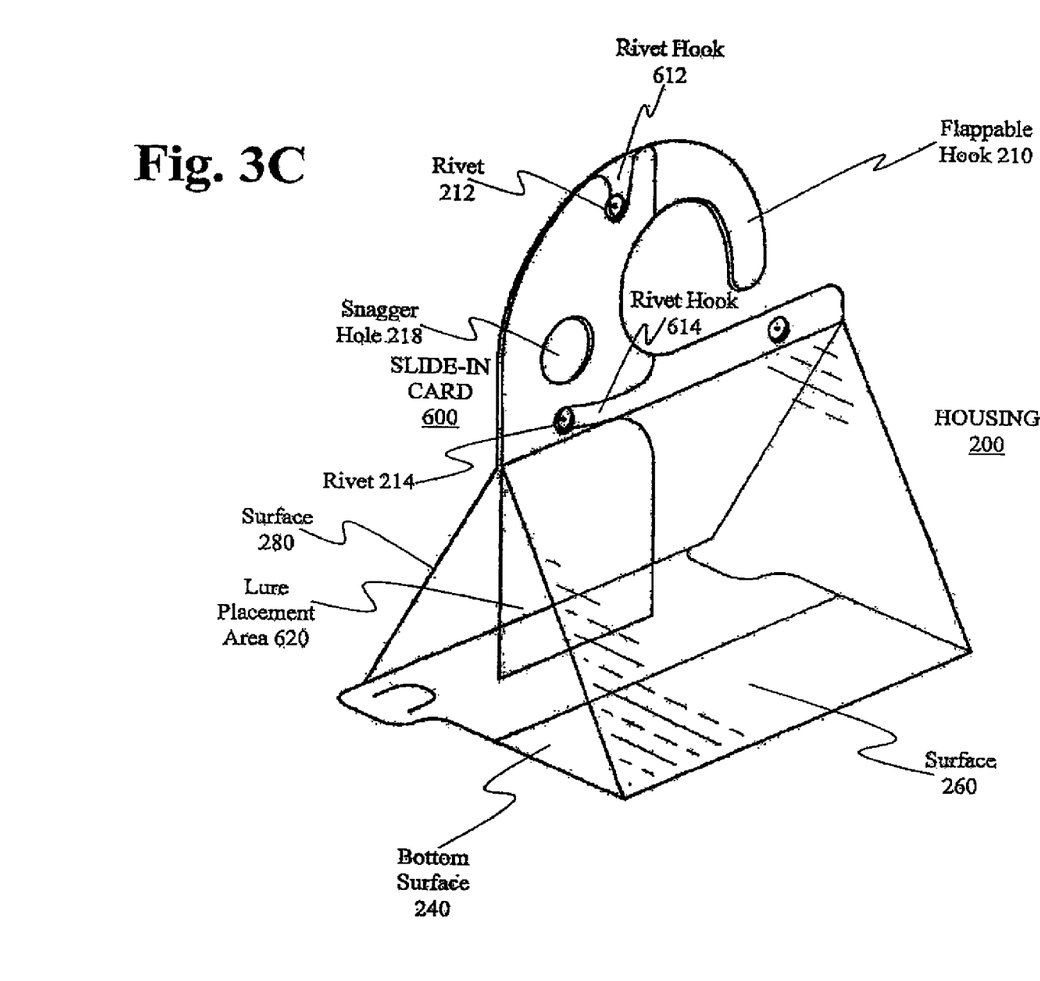
FIG. 3C is a schematic of a slide-in card attached to a housing for an insect trap according to an embodiment of the invention.

In FIG. 3B, an exemplary illustration of how slide-in card 500 may attach to assembled housing 200 according to an embodiment of the invention is provided. As illustrated, slide-in card 600 attaches to flappable hook 210 by first being slid between flappable hook portions 110A and 110B so that rivet hook 612 engages with rivet 212, as shown. Once engaged, slide-in card 500 could then be swiveled into the enclosure of assembled housing 200 in the direction of motion shown. Specifically, slide-in card 600 is swiveled into the enclosure so that snagger hole 618 aligns with snagger hole 218, and so that rivet hook 614 engages with rivet 214, as shown in FIG. 3C. As a result, a lure could be placed anywhere on placement area 620 (e.g., a replaceable pherenome lure adhesive stamp attached to either side of placement area 620 or a septa plug inserted into a hole (not pictured) in placement area 620) and replaced independently from insect trap liners inserted into any of surfaces 240, 260, and/or 280.

Figure 4A:
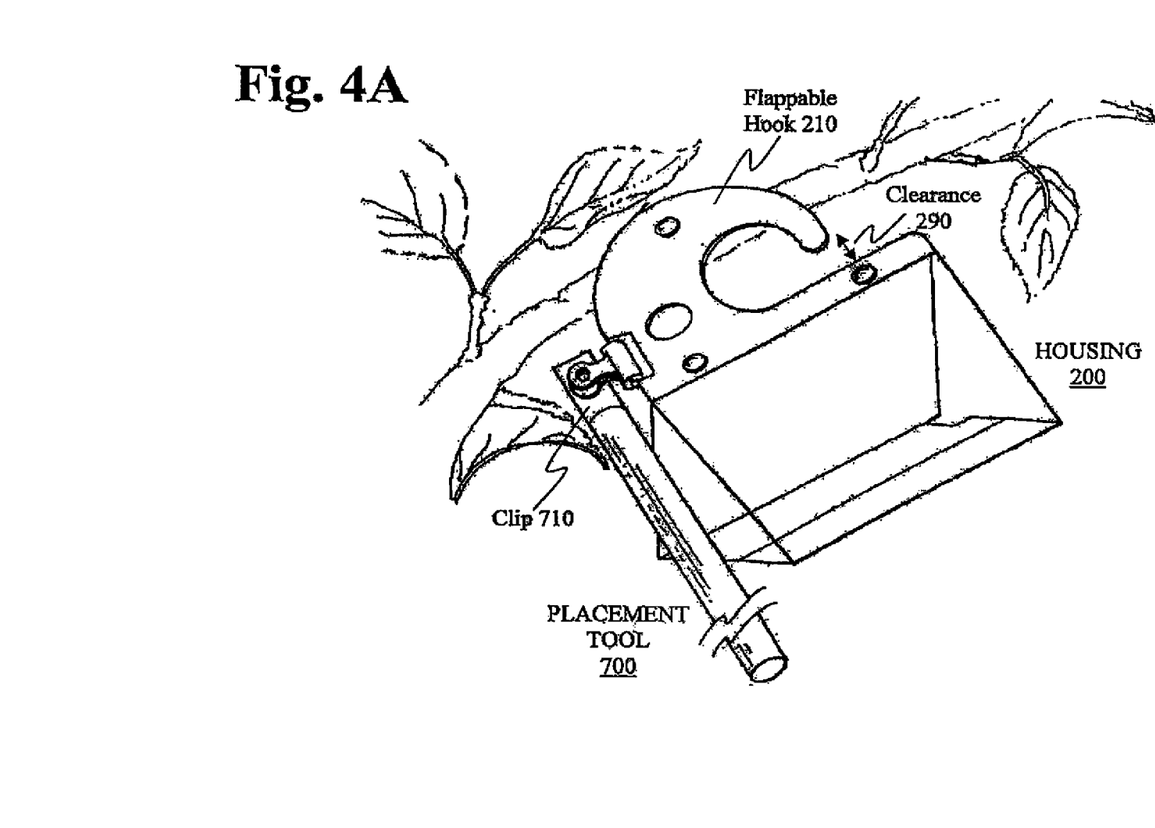
FIG. 4A is a schematic of a placement extension tool attached to a housing for an insect trap according to an embodiment of the invention.
Figure 4B:
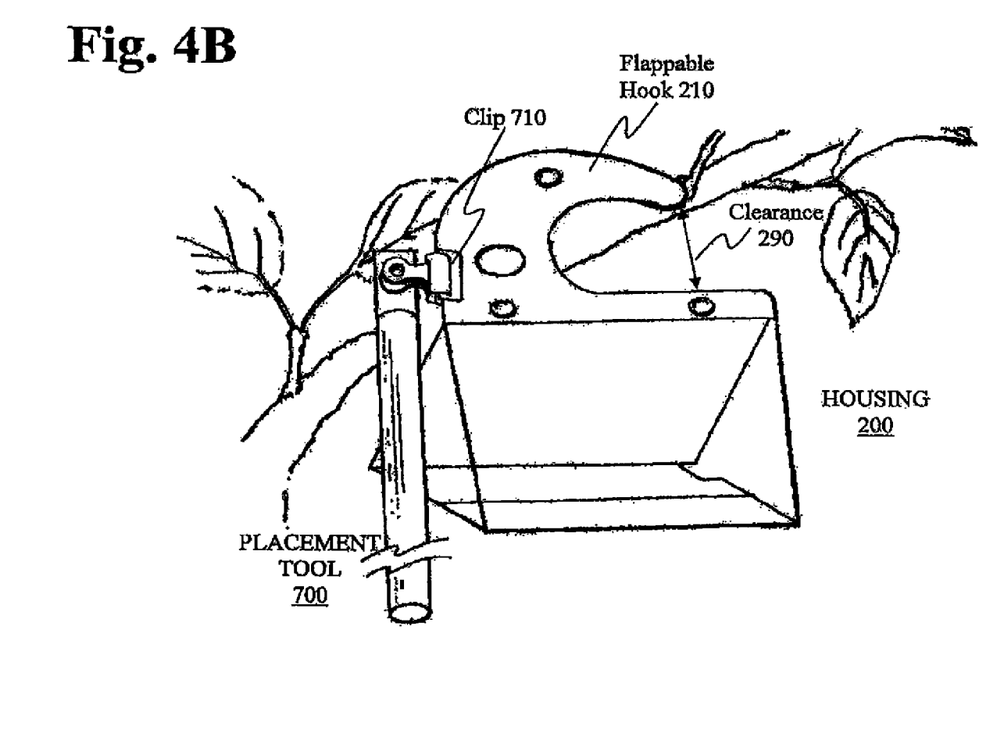
FIG. 4B is an illustration of how a flappable hook may bend onto a location during placement according to an embodiment of the invention.
Figure 4C:
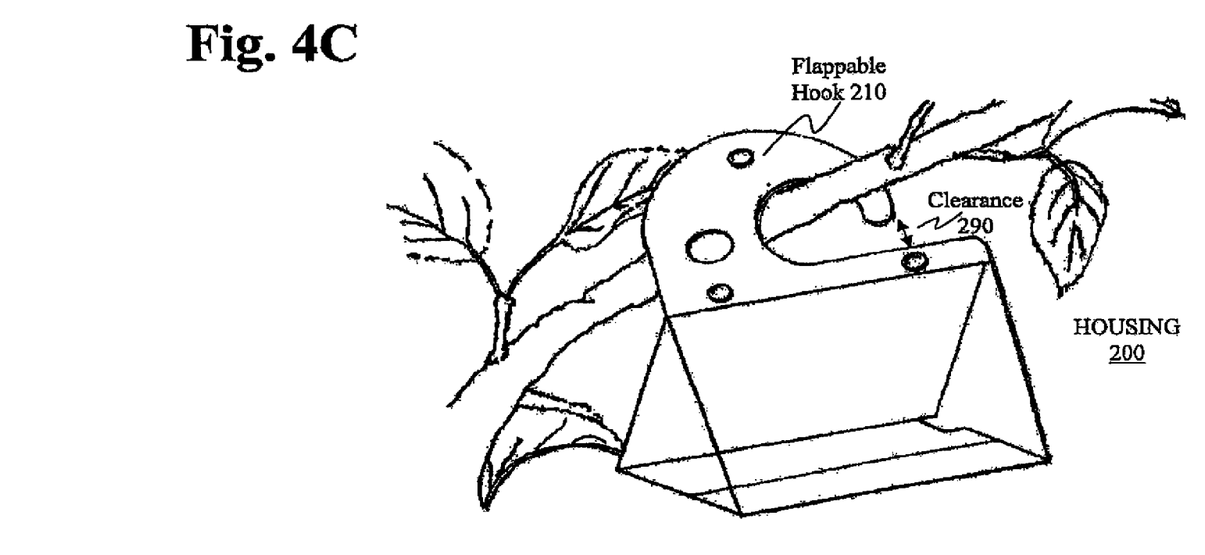
FIG. 4C is an illustration of a housing for an insect trap placed onto a location according to an embodiment of the invention.

In FIGS. 4A-4C, a method and apparatus for placing an insect trap onto a placement location according to an embodiment of the invention is provided. In FIG. 4A, for example, a schematic of a placement extension tool 700 attached to an assembled housing 200 is provided. As shown, extension tool 700 preferably includes a clip 710, which releasably attaches to the end of flappable hook 210 opposite clearance 290. Here, it should be appreciated that any of a plurality of attachment mechanisms known in the art may be used for clip 710, so long as clip 710 may be detached from flappable hook 210 after flappable hook 210 is placed on a placement location without having to directly touch the clip-end of extension tool 700 (e.g., by appropriately designing the grip force of clip 710 so that extension tool 700 could be yanked away from flappable hook 210 without pulling flappable hook off the placement location).

Because of the bending properties of flappable hook 210, placing assembled housing 200 onto a placement location presents many advantages over prior art insect traps. For example, the length of clearance 290 could be minimized so as to ensure a more secure placement of assembled housing 200 onto a placement location. Moreover, because prior art insect traps typically use wire hooks, the clearances for these wire hooks must be wider than the diameters of the desired placement locations. In FIG. 4B, an illustration of how a flappable hook 210 may bend onto a location during placement according to an embodiment of the invention is provided. As illustrated, flappable hook 210 bends as assembled housing 200 is moved closer to the placement location in a manner that essentially widens clearance 290. Then, once assembled housing 200 is close enough to the placement location, flappable hook 210 flaps back into its original state so that flappable hook 210 is substantially wrapped around the placement location. Clip 710 could then be disengaged from flappable hook 210 (e.g., by gently yanking extension tool 700 away from flappable hook 210) so that assembled housing 200 securely rests on the placement location as shown in FIG. 4C.

Figure 5A:
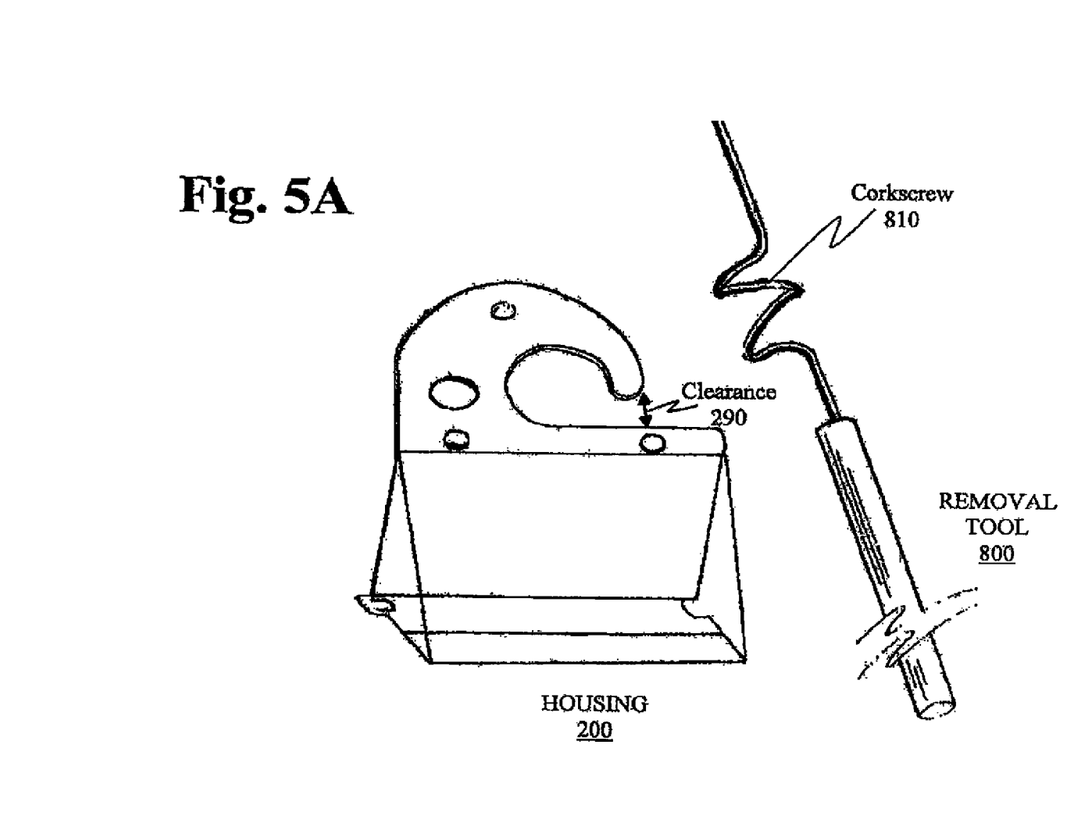
FIG. 5A is a schematic of a removal extension tool and a housing for an insect trap according to an embodiment of the invention.
Figure 5B:
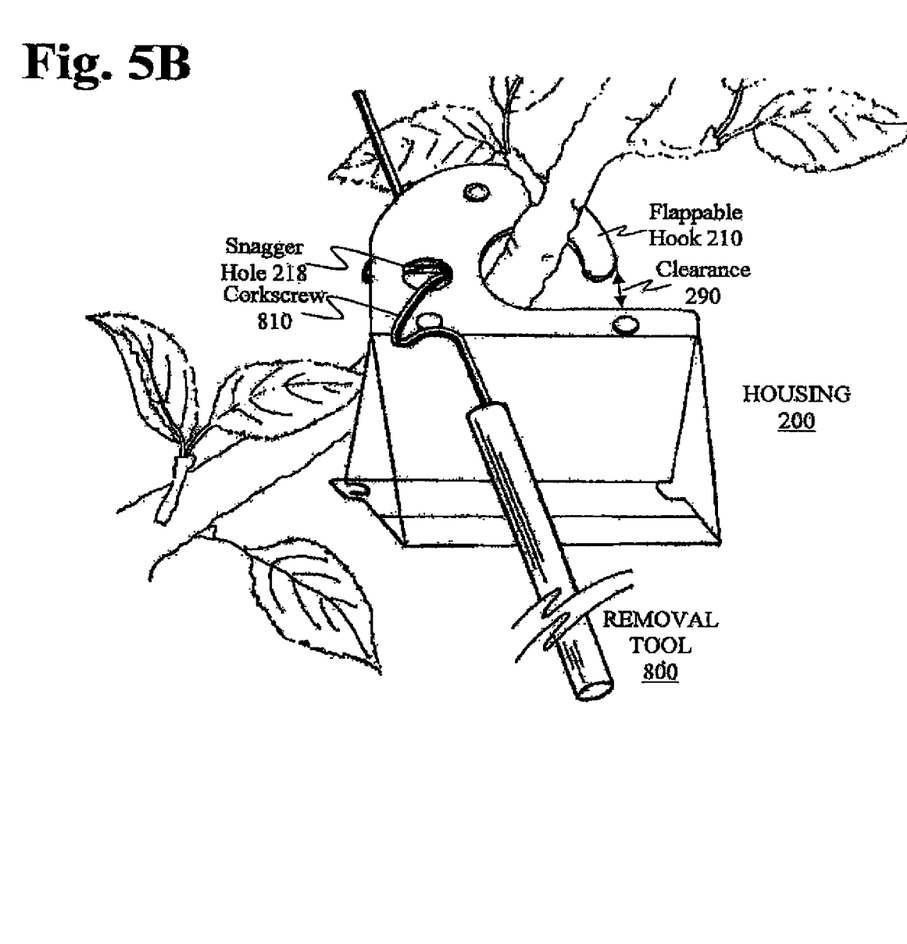
FIG. 5B is a schematic of a removal extension tool engaged with a housing for an insect trap prior to removal according to an embodiment of the invention.
Figure 5C:
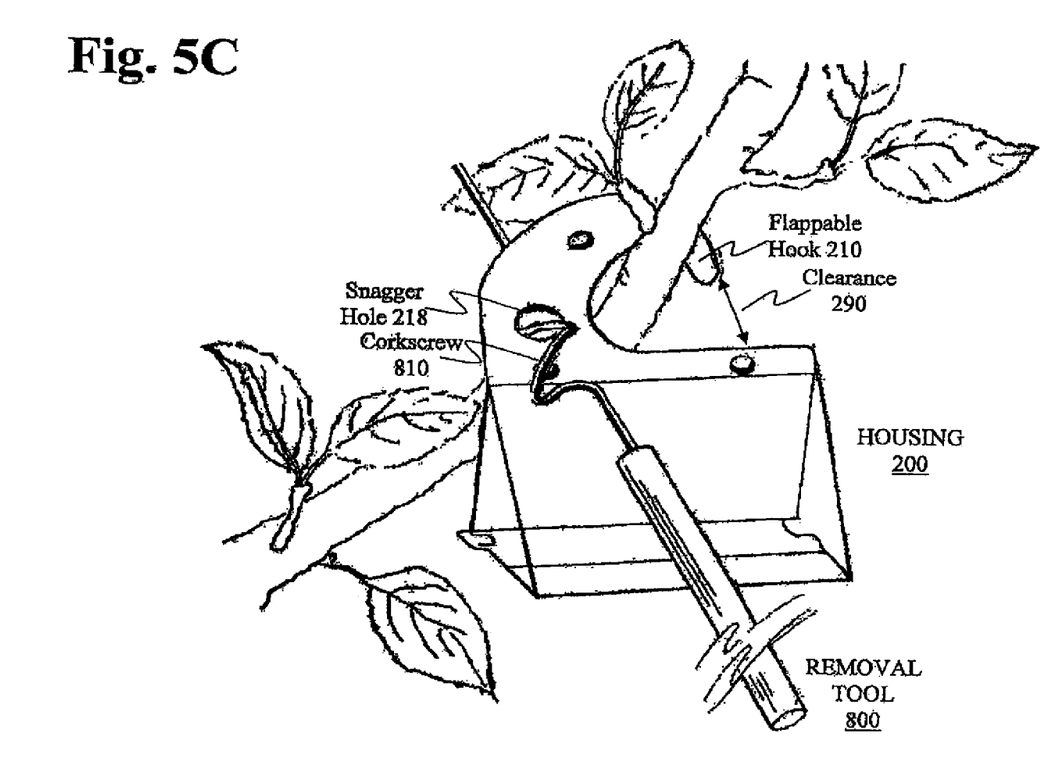
FIG. 5C is an illustration of how a flappable hook may bend off a location during removal according to an embodiment of the invention.
Figure 5D:
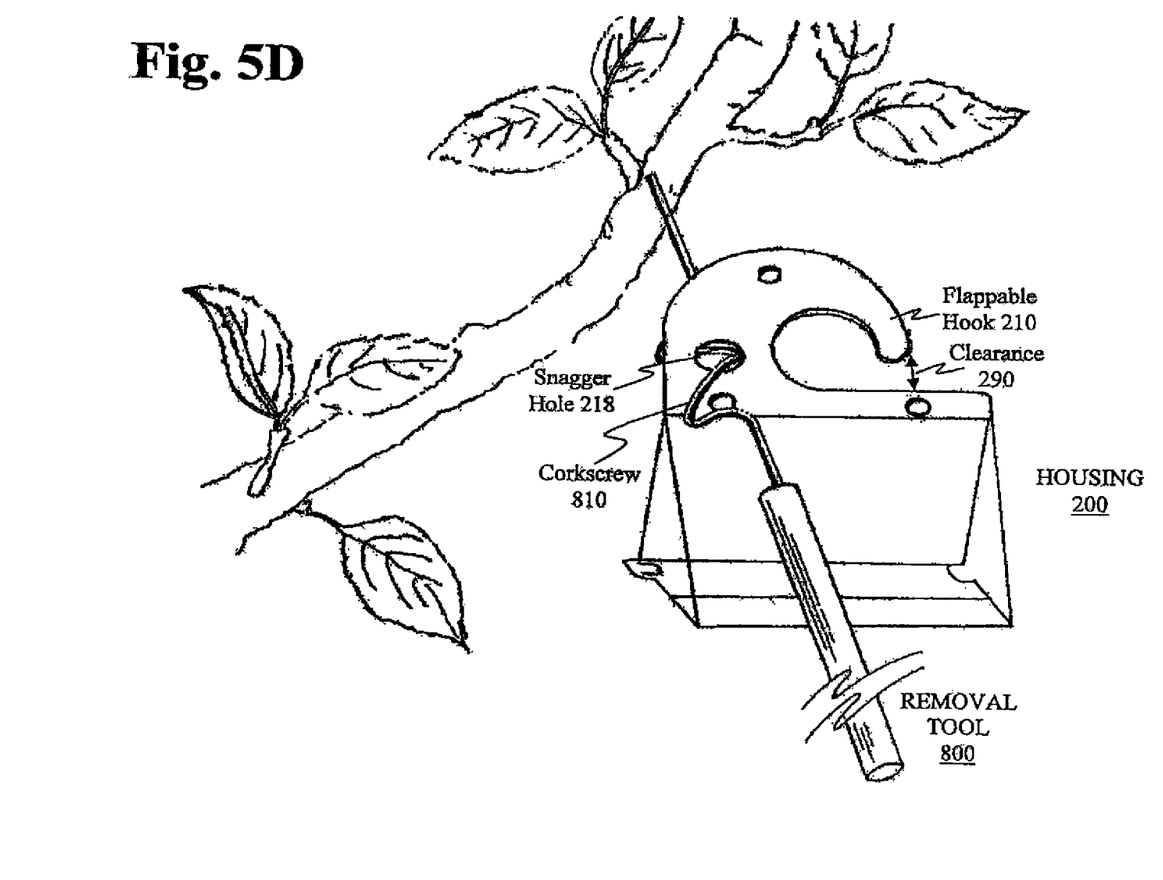
FIG. 5D is a schematic of a removal extension tool engaged with a housing for an insect trap after removal according to an embodiment of the invention.

In FIGS. 5A-5D, a method and apparatus for removing an insect trap from a placement location according to an embodiment of the invention is also provided. In FIG. 5A, for example, a schematic of a housing 200 for an insect trap and a removal extension tool 800 having a corkscrew end 810 according to an embodiment of the invention is shown. As illustrated in FIG. 5B, removal extension tool 800 engages with assembled housing 200 by twisting corkscrew end 810 through snagger hole 218. Once engaged, removal extension tool 800 could then be used to bend flappable hook 210 away from the placement location so that clearance 290 is widened, as illustrated in FIG. 5C. Then, once assembled housing 200 is far enough away from the placement location, flappable hook 210 flaps back into its original state so that flappable hook 210 is released from the placement location as shown in FIG. 5D.

The present invention has been described above with reference to several different embodiments. However, those skilled in the art will recognize that changes and modifications may be made in the above described embodiments without departing from the scope and spirit of the invention. For example, although removal extension tool 800 and placement extension tool 700 are shown to be separate apparatuses, they could also be embodied in the same apparatus (e.g., by having clip 710 and corkscrew 810 on opposite ends of the same extension tool and/or configuring the extension tool so that clip 710 and corkscrew 810 may be screwed on interchangeably). Furthermore, while the present invention has been described in connection with a specific processing flow, those skilled in the art will recognize that a large amount of variation in configuring the processing tasks and in sequencing the processing tasks may be directed to accomplishing substantially the same functions as are described herein. These and other changes and modifications which are obvious to those skilled in the art in view of what has been described herein are intended to be included within the scope of the present invention.

What is claimed is:

1. An insect trap, comprising:
   a durable housing formed from a single plastic sheet, wherein the housing comprises:
   a flappable hook-shaped hanger formed out of a portion of the single plastic sheet, wherein the hook-shaped hanger extends outwardly from the housing and includes a tip portion extending inwardly toward the housing, so that the flappable hook-shaped hanger is capable of being substantially wrapped around a placement location; and
   an enclosure having two open ends, wherein the enclosure having two open ends, wherein the enclosure includes a plurality of surfaces; and
   at least one insect trap liner, wherein the at least one insect trap liner releasably attaches to at least one of the plurality of surfaces.

2. An insect trap as in claim 1, wherein the sheet comprises polypropylene.

3. An insect trap as in claim 1 further comprising a slide-in card that releasably attaches to the housing wherein the slide-in card is configured to attach to the housing so as to hold a lure substantially within the enclosure and away from the plurality of surfaces.

4. An insect trap as in claim 1, wherein the at least one of the plurality of surfaces includes a fastening tab, and wherein the fastening tab secures the at least one insect trap liner to the at least one of the plurality of surfaces.

5. An insect trap as in claim 1 further comprising an extension tool, wherein the extension tool is configured to releasably attach to the housing.

6. An insect trap as in claim 5, wherein an end of the extension tool includes a clamp.

7. An insect trap as in claim 5, wherein an end of the extension tool includes a corkscrew apparatus configured to be twisted through a hole in the housing proximate to the flappable hook-shaped hanger.

8. An insect trap, comprising:
   a durable housing formed from a single sheet of transparent plastic, wherein the housing comprises:
   a flappable hook-shaped hanger portion having an inwardly oriented tip, so that the flappable hook-shaped hanger portion is capable of being substantially wrapped around a placement location, wherein the flappable hook-shaped hanger portion is formed out of a portion of the single sheet of plastic; and
   an enclosure having two open ends, wherein the enclosure includes an interior wall and an exterior wall; and
   at least one insect trap liner, wherein the at least one insect trap liner releasably attaches to the interior wall.

9. An insect trap as in claim 8, wherein the plastic comprises polypropylene.

10. An insect trap as in claim 8 further comprising a slide-in card that releasably attaches to the housing wherein the slide-in card is configured to attach to the housing so as to hold a lure substantially within the enclosure and away from the interior wall.

11. An insect trap as in claim 8, wherein the interior wall comprises a bottom surface positionable parallel to a ground in use and a plurality of remainder surfaces positioned above the bottom surface, and wherein the at least one insect trap liner only releasably attaches to the remainder surfaces.

12. An insect trap as in claim 8 further comprising an extension tool, wherein the extension tool is configured to releasably attach to the housing.

13. An insect trap as in claim 12, wherein an end of the extension tool includes a clamp.

14. An insect trap as in claim 12, wherein an end of the extension tool includes a corkscrew apparatus configured to be twisted through a hole in the housing proximate to the flappable-hook shaped hanger portion.

15. A method for trapping insects, comprising:
    inserting at least one replaceable insect trap liner into a durable housing, wherein the housing is formed from a single sheet of transparent plastic and comprises:
        a flappable hook-shaped hanger having an inwardly oriented tip, so that the flappable hook-shaped hanger is capable of being substantially wrapped around a placement location, wherein the flappable hook-shaped hanger is formed out of a portion of the single sheet of plastic; and
        an enclosure having two open ends, wherein the enclosure includes an interior wall and an exterior wall; and
    hanging the housing from the flappable hook-shaped hanger onto a desired location.

16. The method as in claim 15 further comprising attaching a lure onto a slide-in card, wherein the slide-in card releasably attaches to the housing, and wherein the slide-in card is configured to attach to the housing so as to hold the lure substantially within the enclosure and away from the interior wall.

17. The method as in claim 16, wherein the attaching step comprises inserting a septa into a hole in the slide-in card.

18. The method as in claim 15, wherein the interior wall comprises a bottom surface parallel to a ground and a plurality of remainder surfaces positioned above the bottom surface, and wherein the inserting step comprises inserting the at least one insect trap liner only onto one of the remainder surfaces.

19. The method as in claim 15, wherein the hanging step further comprises clamping the housing onto an end of an extension tool, and wherein the end is configured to releasably attach to the housing.

20. The method as in claim 15 further comprising the step of retrieving the housing, wherein the retrieving step comprises twisting a corkscrew apparatus through a hole in the housing proximate to the flappable hook-shaped hanger, and wherein the corkscrew apparatus is located at an end of an extension tool.

* * * * *